United States Patent [19]

Nakano et al.

[11] Patent Number: 5,422,448
[45] Date of Patent: Jun. 6, 1995

[54] CONTACT PIECE FOR USE IN A ROTARY ENCODER AND METHOD OF CONSTRUCTING SAME

[75] Inventors: Kunihiko Nakano; Kiyohiko Kumazawa; Kazuo Amagai, all of Tokyo, Japan

[73] Assignee: SMK Corp., Tokyo, Japan

[21] Appl. No.: 154,219

[22] Filed: Nov. 17, 1993

[30] Foreign Application Priority Data

Nov. 17, 1992 [JP] Japan .................... 4-85215 U

[51] Int. Cl.$^6$ .................... H01H 19/54; H01H 1/12; H01H 11/04
[52] U.S. Cl. .................... 200/11 DA; 200/11 G; 200/11 R; 200/275; 29/622; 29/874
[58] Field of Search ............ 200/11 R, 11 D, 11 DA, 200/11 G, 11 J, 11 K, 283, 284, 275, 292; 29/826, 874–886, 622

[56] References Cited

U.S. PATENT DOCUMENTS

| | | | |
|---|---|---|---|
| 3,030,460 | 4/1962 | Huetten et al. | 200/11 G |
| 3,727,015 | 4/1973 | Voland et al. | 200/38 R |
| 3,736,390 | 5/1973 | Lockard | 200/11 DA |
| 3,809,838 | 5/1974 | Coppola | 200/532 |
| 4,145,585 | 3/1979 | Iwasaki | 200/11 DA |
| 4,481,386 | 11/1984 | Rose | 200/11 R |
| 4,497,984 | 2/1985 | Ashman et al. | 200/11 DA |
| 4,625,084 | 11/1986 | Fowler et al. | 200/11 DA |
| 4,758,693 | 7/1988 | Haffman | 200/11 R |

*Primary Examiner*—J. R. Scott
*Attorney, Agent, or Firm*—Mark A. Catan; Thomas R. Morrison

[57] ABSTRACT

A contact piece for a rotary encoder is an unitary piece having a terminal, a thin plate spring, and a bent-back section on the tip of the thin plate spring. The bent-back section is bent at an angle of approximately 180 degrees in the plane. The contact brush is located on the bent-back section. In one embodiment, the terminal, thin plate spring, bent-back section and contact brush are stamped from the same metal plate. In another embodiment, the terminal, thin plate spring and bent-back section are stamped from the same metal plate and a separate contact brush is connected to the bent-back section. The contact piece is pushed in from the bottom side of the rotary encoder housing, and the contact brush is set such that contact is made with an electrode pattern. When a rotating plate turns, a pulse having a low or high signal is generated. This configuration provides the rotary encoder with an adequately long span S, which can be precisely set and easily produced.

13 Claims, 6 Drawing Sheets

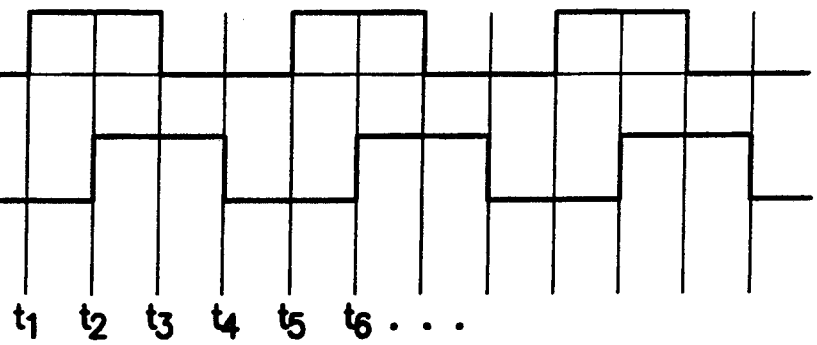
FIG. 7(a) PRIOR ART
FIG. 7(b) PRIOR ART
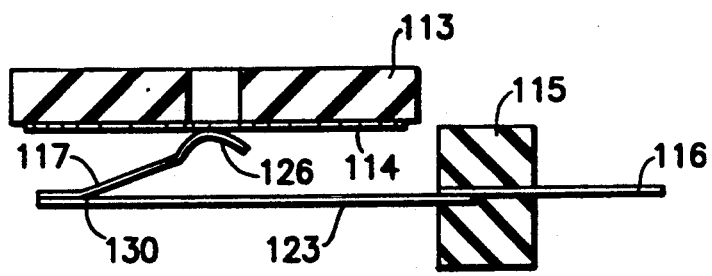
FIG. 8(a) PRIOR ART
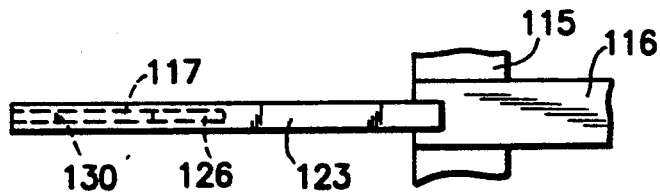
FIG. 8(b) PRIOR ART

CONTACT PIECE FOR USE IN A ROTARY ENCODER AND METHOD OF CONSTRUCTING SAME

This invention relates to rotary encoders, which are used in devices such as a computer mouse, rotary switches and joysticks. More particularly, the invention relates to a contact brush used in a rotary encoder.

Referring to FIGS. 5 and 6, prior art rotary encoders comprise a bushing 111 pressed into a housing 110, which has an open, bottom surface. A shaft 112 is inserted into bushing 111 from above so that shaft 112 can spin freely therein. A rotating plate 113, which has an electrode pattern 114, is fixed to the bottom of shaft 112. A contact brush 117 is located on the tip of a terminal 116 and touches electrode pattern 114. Terminal 116 is supported on a terminal support 115. The bottom surface of housing 110 is covered by a cover 118.

Referring to FIG. 6, electrode pattern 114 is formed at intervals defined by an angle theta1. Starting from the outer perimeter of electrode pattern 114, there is a first electrode 120, a second electrode 121, and a common section third electrode 122 in the center. First electrode 120 and second electrode 121 are offset from each other at an angle theta2. First electrode 120, second electrode 121, and third electrode 122 are in contact with, respectively, contact brushes 117 of a first contact 131, a second contact 132, and a third contact 133.

First contact 131 touches first electrode 120 of electrode pattern 114 when rotating plate 113 turns in a clockwise direction (as indicated by the arrow) at a time t1. At a time t2, second contact 132 touches second electrode 121 of electrode pattern 114. At a time t3, first contact 131 is disconnected from first electrode 120. At a time t4, second contact 132 is disconnected from second electrode 121. Referring to FIGS. 7(a) and (b), a pulse having a Low or High signal level is generated between first contact 131 and third contact 133, and between second contact 132 and third contact 133.

Referring to FIG. 5, prior art contact brush 117 is welded to terminal 116 with a connecting piece 119. The disadvantage of this approach is that the length of span S can not be made long as required. Furthermore, the contact between contact brush 117 and electrode pattern 114 is unreliable. Making span S longer would not be desirable because the longer length increases the overall size of the rotary encoder.

Referring to FIG. 8, in another prior art device, a thin plate spring 123 is connected to terminal 116. Contact brush 117 is then welded on to the tip of thin plate spring 123 such that contact brush 117 overlaps thin plate spring 123. In this arrangement, span S would be the sum of the lengths of thin plate spring 123 and contact brush 117. The problem of the prior art shown in FIG. 5 would be solved to some extent. However, the arrangement of FIG. 8 is inefficient and imprecise because contact brush 117 has to be overlapped with thin plate spring 123 and then welded to the tip of thin plate spring 123.

Furthermore, the prior art arrangements have individual parts, such as contact brush 117, a contact 126, and a bent piece 130, which have to be processed beforehand. The individual parts then have to be welded to terminal 116 and thin plate spring 123. This method results in inconsistencies in the length of span S.

OBJECTS AND SUMMARY OF THE INVENTION

The object of the present invention is to provide a rotary encoder which has a sufficient length for span S, has a high level of precision in setting the length of span S and is easier to manufacture.

Briefly stated, a contact piece for a rotary encoder is an unitary piece having a terminal, a thin plate spring, and a bent-back section on the tip of the thin plate spring. The bent-back section is bent at an angle of approximately 180 degrees in the plane. The contact brush is located on the bent-back section. In one embodiment, the terminal, thin plate spring, bent-back section and contact brush are stamped from the same metal plate. In another embodiment, the terminal, thin plate spring and bent-back section are stamped from the same metal plate and a separate contact brush is connected to the bent-back section. The contact piece is pushed in from the bottom side of the rotary encoder housing, and the contact brush is set such that contact is made with an electrode pattern. When a rotating plate turns, a pulse having a low or high signal is generated. This configuration provides the rotary encoder with an adequately long span S, which can be precisely set and easily produced.

According to an embodiment of the present invention, a contact brush for a rotary encoder is provided which comprises a contact piece for use in a rotary encoder which outputs a signal responsive to a rotation of a plate having an electrode pattern on a surface thereof, the contact piece having as integral portions thereof, a terminal, a plate spring, a bent back portion and a contact brush, the plate spring extending from the terminal in a first direction, the bent-back section connected to an end of the plate spring, the contact brush including means for electrically contacting the electrode pattern, extending from said bent-back section in a second direction.

According to a further embodiment of the present invention, a contact brush for a rotary encoder is provided which comprises a contact piece for use in a rotary encoder which outputs a signal responsive to a rotation of a plate having an electrode pattern on a surface thereof, the contact piece comprising: the contact piece having as integral portions thereof, a terminal, a plate spring, and a lug portion, the plate spring extending from the terminal in a first direction, the lug portion connected to an end of the plate spring, a contact brush including means for electrically contacting the electrode pattern, and means for connecting the contact brush to the lug section, the contact brush being disposed in a second direction.

According to a still further embodiment of the present invention, a method of constructing the contact piece according to the structure provided above, the method comprising the steps of: stamping a pattern of predetermined shape from a sheet of metal, the predetermined shape corresponding to a plurality of the contact pieces held together by a frame adjacent thereto, bending an end of each the contact brush in a U-shape to form a contact, the contact convex in a first direction, bending the contact brush at a base thereof in the first direction, molding a first, second and third contact piece of the plurality of contact pieces to a terminal support, and severing the first, second and third contact piece of the plurality of contact pieces from the frame.

The above and other objects, features and advantages of the present invention will become apparent from the following description read in conjunction with the accompanying drawings in which like reference numerals designate the same elements.

BRIEF DESCRIPTION OF DRAWINGS

FIG. 7 is an output waveform from the prior art device shown in FIG. 5.

FIG. 8(a) is a cross sectional view of another prior art device.

FIG. 8(b) is a flat view of the prior art device shown in FIG. 8(a).

DETAILED DESCRIPTION OF THE PREFERRED EMBODIMENTS

Figure 1:
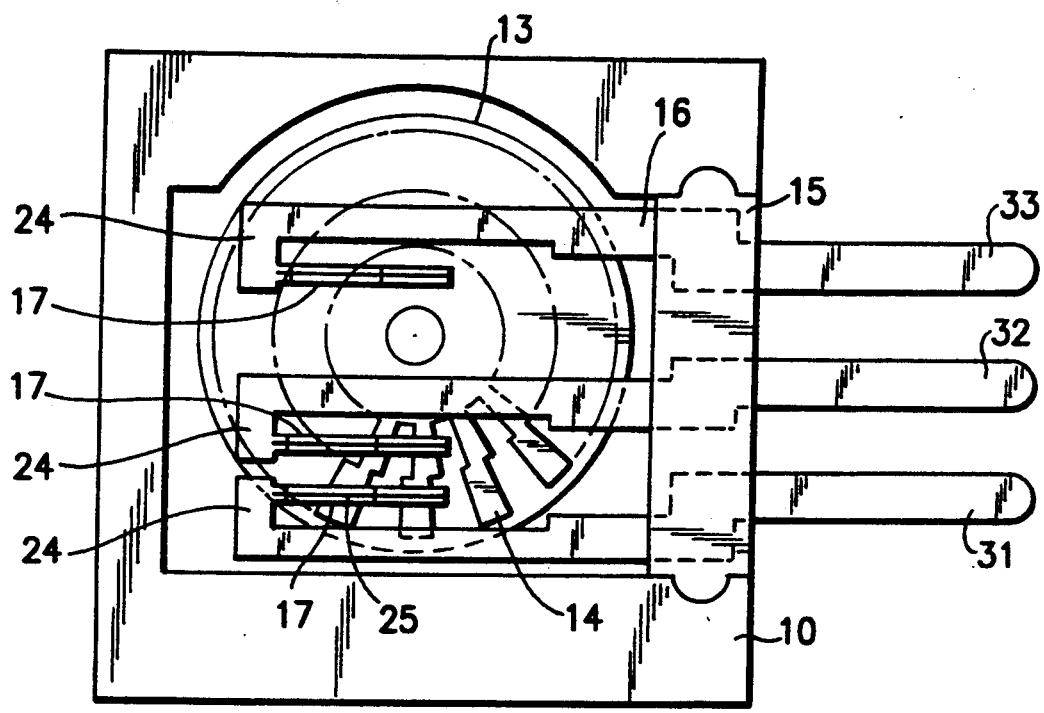
FIG. 1 is a bottom view of an embodiment of the rotary encoder according to the present invention.
Figure 2:
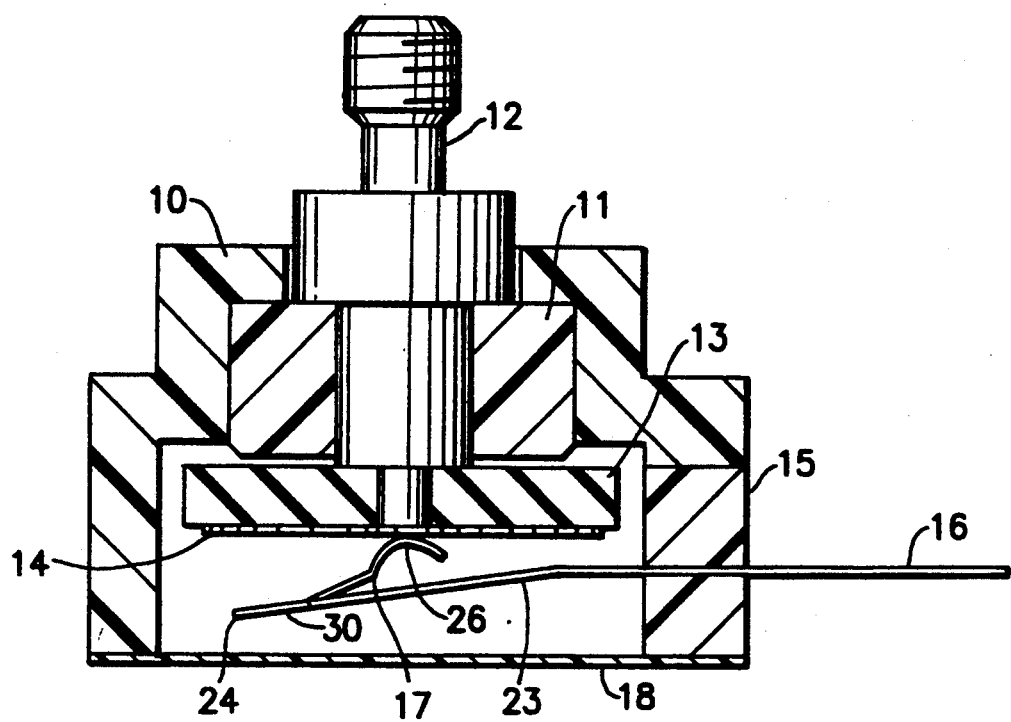
FIG. 2 is a vertical cross section of the rotary encoder shown in FIG. 1.

Referring to FIGS. 1 and 2, a rotary encoder has a bushing 11 lining a housing 10, which has an open, bottom side. A shaft 12 is inserted into bushing 11 from above so that shaft 12 can rotate freely therein. A rotating plate 13, which has an electrode pattern 14, is fixed to the bottom of shaft 12. A contact brush 17, which is placed on the tip of terminal 16, is set into contact with electrode pattern 14. Terminal 16 is supported by a terminal support 15. A cover 18 covers the bottom side of housing 10.

In an embodiment of the present invention, a contact piece 5 is an unitary piece composed of terminal 16, thin plate spring 23 and contact brush 17. In this embodiment, the middle of terminal 16 is molded to terminal support 15. A bent-back section 24, located at the tip of thin plate spring 23, is stamped so that it is bent back at an angle of 180° within the plane. A slot 25 is cut lengthwise on contact brush 17. Contact brush 17 has a contact piece 26 and a bend 30. A first contact 31, a second contact 32 and a third contact 33 are configured and constructed in the same manner.

Referring to FIGS. 3(a)–(e), the manufacturing process of first contact 31, second contact 32 and third contact 33 are more fully described.

Figure 3A:
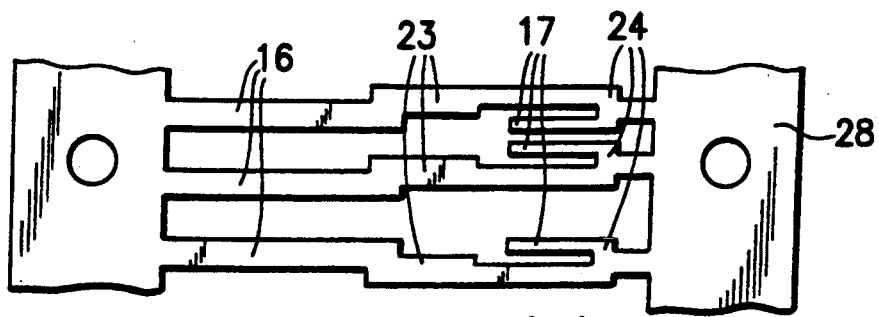
FIGS. 3(a)–(e) illustrate the production process of the rotary encoder shown in FIG. 1.

Referring to FIG. 3(a) a thin metal plate 28 having a specified thickness, and certain conductive and spring properties is selected. An outline of the desired pattern is laid out on thin metal plate 28. The pattern is then stamped out by a pressing machine. The remaining structure of thin metal plate 28 provides a frame thereof for contact pieces 5. Referring to FIG. 1, the positions of first contact 31, second contact 32 and third contact 33 are set so that they have the required interval spacing. First contact 31, second contact 32 and third contact 33 are composed of terminal 16, thin plate spring 23, bent-back section 24 and contact brush 17. Multiple sets are consecutively stamped, with the above three pieces forming one set.

Figure 3B:
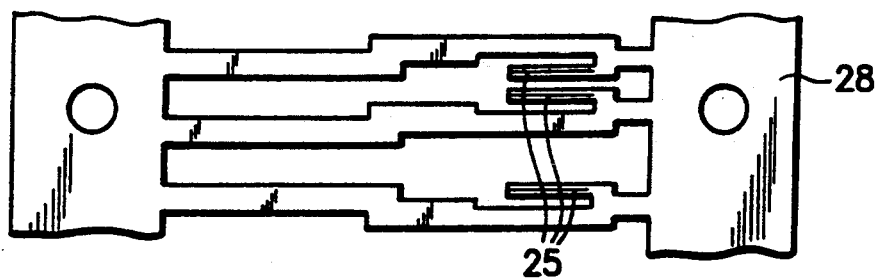
Figure 3C:
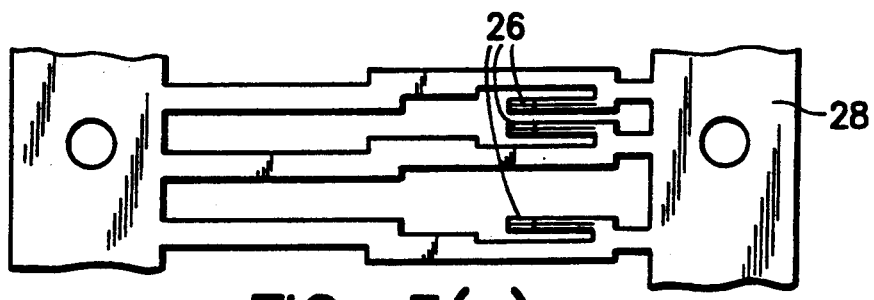

Referring to FIG. 3(b), a slot 25 is cut lengthwise on all contact brushes 17. Referring to FIG. 3(c), contact 26 is formed by bending the tip of contact brush 17 in an U-shape.

Figure 3D:
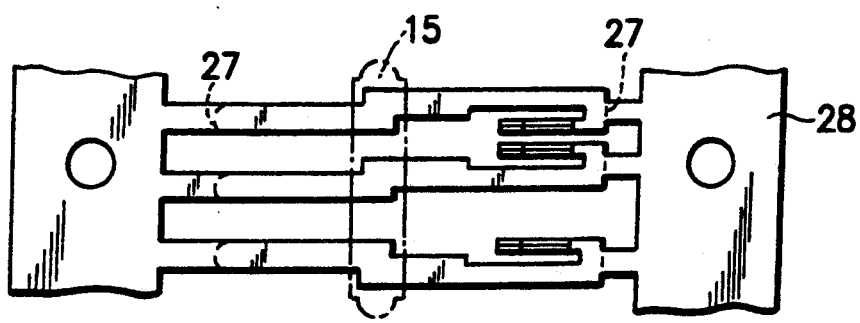
Figure 3E:
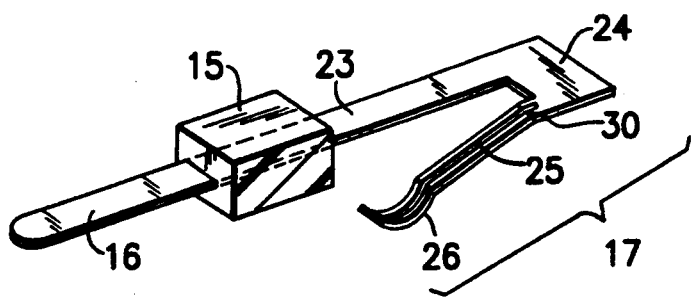

Referring to FIG. 3(d) and 3(e), a small downward bend, bend 30, is made at the base of contact brush 17. The distance of span S, from terminal support 15 to contact 26, is set precisely. Then, first contact 31, second contact 32 and third contact 33 are molded to terminal support 15. After molding, the section is cut at dashed lines 27. Referring to FIG. 3(e), a completed section is depicted.

The completed section is pushed in from the bottom side of housing 10 and contact brush 17 is put into contact with electrode pattern 14.

Referring to FIGS. 4(a)–4(e), another embodiment of the rotary encoder is described.

Figure 4D:
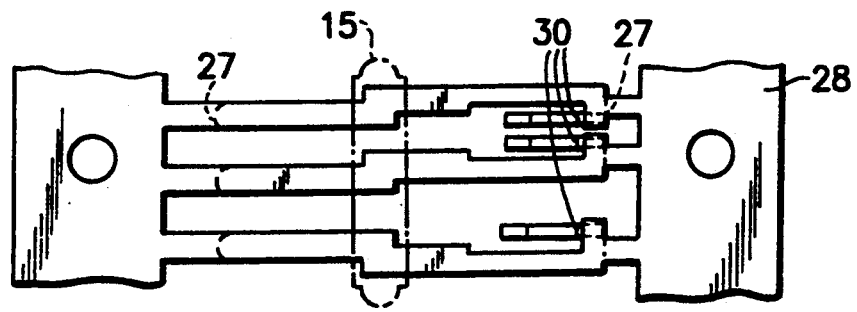
FIGS. 4(a)–(e) illustrate the production process of another embodiment of the rotary encoder according to the present invention.
Figure 4E:
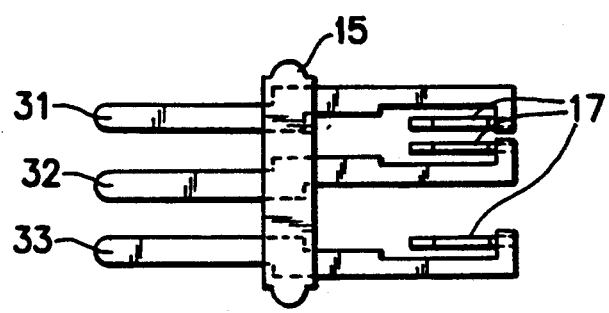
Figure 4A:
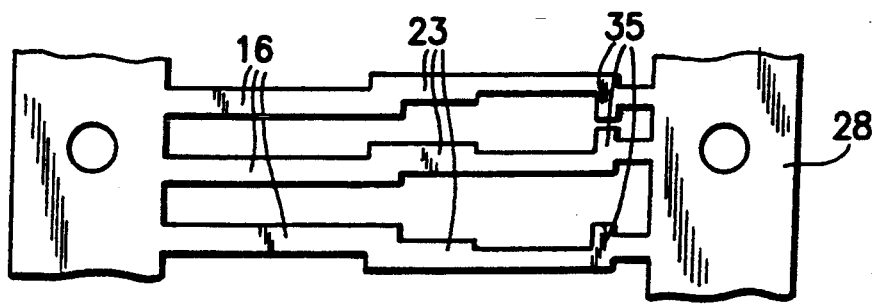

Referring to FIG. 4(a), thin metal plate 28 has a pattern laid out on it, which is then stamped out by a press. First terminal 31, second terminal 32, and third terminal 33 are formed by terminal 16, thin plate spring 23 and a lug section 35. Note that terminal 16 does not contain contact brush 17. First contact 31, second terminal 32, and third terminal 33 are set at the intervals shown in FIG. 1. Multiple sets are consecutively stamped, with the above three pieces forming one set.

Figure 4B:
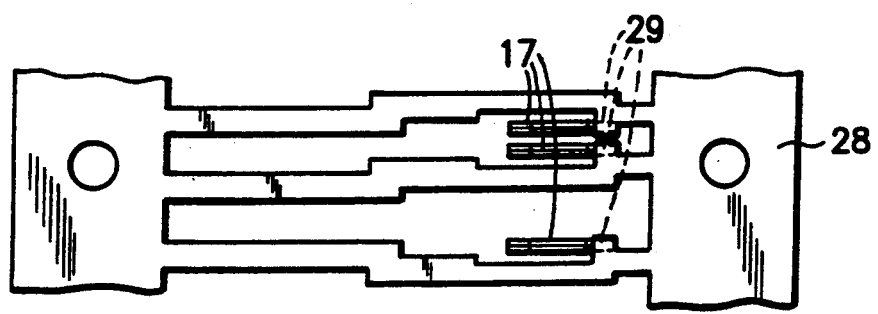
Figure 4C:
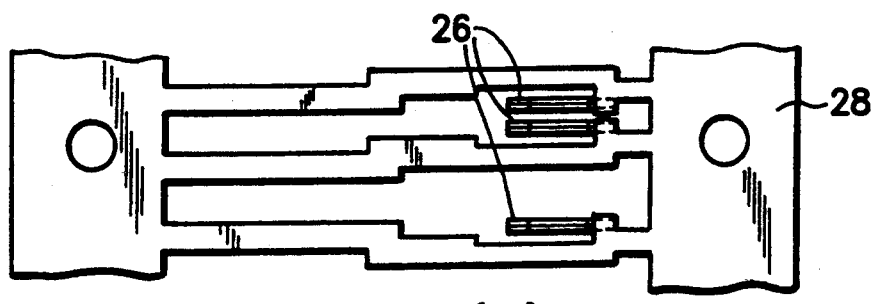
Figure 5:
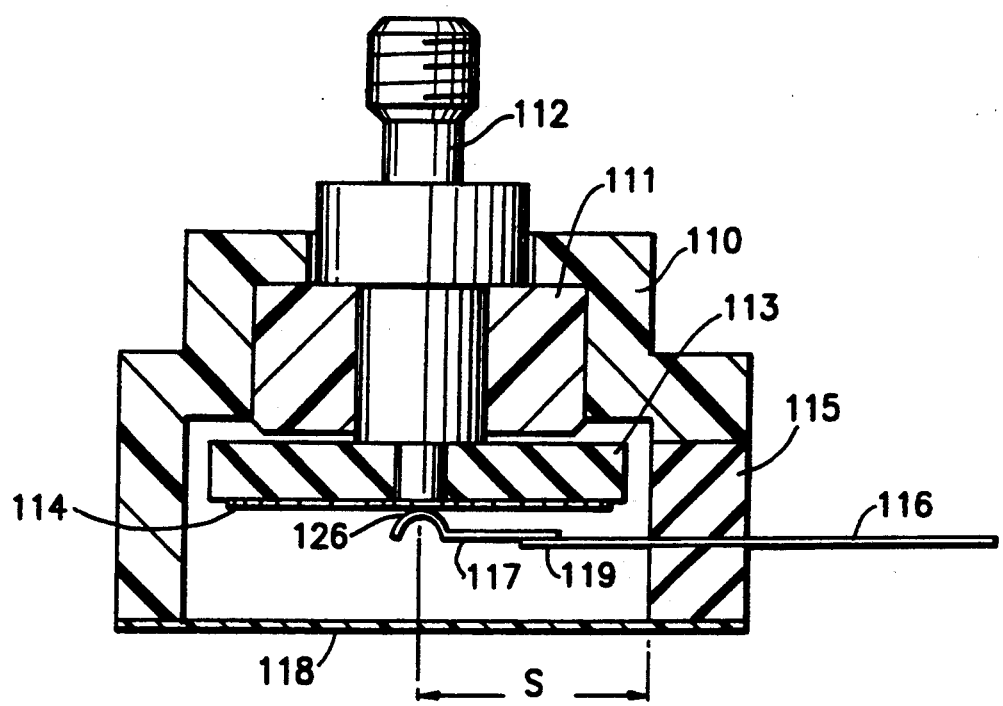
FIG. 5 is a cross sectional view of a prior art rotary encoder.
Figure 6:
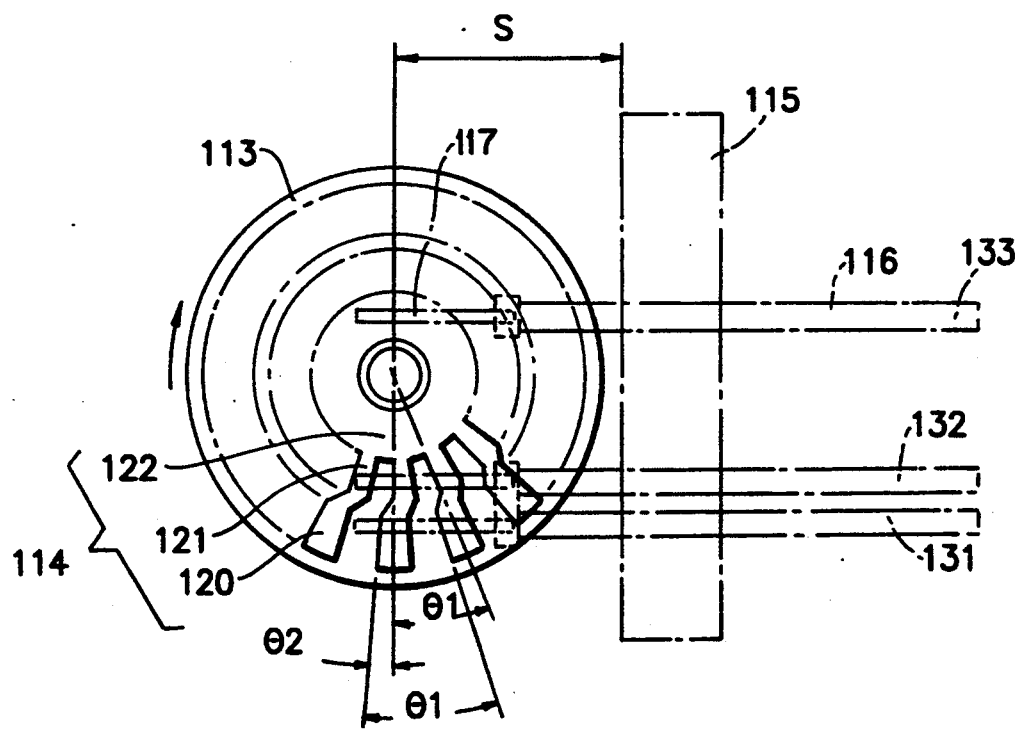
FIG. 6 is a bottom view of the prior art device shown in FIG. 5.

Referring to FIG. 4(b), contact brushes 17 each having slot 25 cut length-wise are attached with connecting piece 29 to lug section 35. Contact brushes 17 are prepared beforehand. Attachment can be done by welding the appropriate sections together. Welding is done on contact brush 17 while it is still flat, before contact 26 and bend 30 have been made. FIGS. 4(c) and 4(d) depict the same intermediate steps as in FIGS. 3(c) and 3(d). Similarly to FIG. 3(e), FIG. 4(e) depicts the completed product.

Functionally, the rotary encoder operates similarly to conventional rotary encoders. The rotary encoder outputs a pulse having a high or low signal level when a rotating plate 13 is rotated clockwise and first contact 31 and second contact 32 engage and disengage from electrode pattern 14.

In this invention, contact piece 5 is an unitary piece including terminal 16, thin plate spring 23, and bent-back section 24 on the tip of thin plate spring 23. Bent-back section 24 is bent-back approximately 180 degrees in the plane. Contact brush 17 is situated on bent-back section 24. Thus, span S is the sum of the lengths of thin plate spring 23, bent-back section 24, and contact brush 17. This results in a longer span S, increases contact pressure stability and increases long-term reliability.

Furthermore, since the unitary piece is molded onto terminal support 15 after any necessary welding and bending operations are completed, the length from terminal support 15 to contact 26 can be set precisely. Furthermore, since thin spring plate 23 is bent and contact brush 17 is located on bent-back section 24, the overall size can be decreased.

What is claimed is:

1. An improved contact piece for use in a rotary encoder, which comprises:
   said contact piece having, as integral portions thereof, a terminal, a plate spring, a bent-back portion, and a contact brush;
   said plate spring having a fixed end for mounting to a fixed base with respect to which said plate rotates;
   said plate spring having a free end which is free to move relative to said fixed end when sufficient to substantially bend said plate spring is applied to said free end;

said plate spring extending from said terminal in a first direction from said fixed end toward said free end;

said bent-back portion connected to said free end of said plate spring; and said contact brush projecting away from said plate spring and including means, extending from said bent-back section in a second direction, for electrically contacting an electrode pattern on a downward-facing surface of said rotary encoder.

2. The contact piece according to claim 1, wherein: said contact piece is laterally offset from said plate spring.

3. The contact piece according to claim 1, wherein: said second direction differs from said first direction by approximately 180°.

4. The contact piece according to claim 1, wherein: said contact brush has at least one slot cut lengthwise.

5. An improved contact piece for use in a rotary encoder, which comprises:

said contact piece having, as integral portions thereof, a terminal, a plate spring, and a lug portion;

said plate spring extending from said terminal in a first direction;

said lug portion connected to an end of said plate spring;

a contact brush connected to said lug portion;

said contact brush including means for electrically contacting an electrode pattern on a downward-facing surface of said rotary encoder; and said contact brush projecting upward from said plate spring in a second direction.

6. The contact piece according to claim 5, wherein: said contact brush is laterally offset from said plate spring.

7. The contact piece according to claim 5, wherein: said second direction differs from said first direction by approximately 180°.

8. The contact piece according to claim 5, wherein: said contact brush has at least one slot cut lengthwise.

9. A method of constructing a contact piece for use in a rotary encoder comprising the steps of:

stamping a pattern of a predetermined shape from a sheet of metal;

said predetermined shape containing a plurality of contact members held together by a frame adjacent thereto, each of said contact members including a contact brush;

bending an end of each said contact brush in a U-shape to form a contact surface, said contact surface being convex in a first direction;

bending each said contact brush at a base thereof in said first direction;

molding at least a first, a second, and a third of said plurality of contact members to a terminal support; and severing said at least first, second, and third of said plurality of contact members from said frame.

10. The method according to claim 9, further comprising the step of:

cutting at least one slot lengthwise in said contact brush, prior to the step of bending an end.

11. A contact element for a rotary encoder comprising:

a single flat plate having a forward leg with a free end, a return leg with a first end, and a connecting leg connecting said free end with said first end, whereby said forward, return, and connecting legs form a single continuous U-shape;

said forward leg having a fixed end opposite said free end for mounting to an insulating base of said rotary encoder;

said return leg having a second end for contacting conductors on a rotor of said rotary encoder; and said rotor being rotatably connect to said base.

12. A contact element for a rotary encoder comprising:

a generally planar element having a forward leg with a free end, a return leg with a first end, and a connecting leg connecting said free end with said first end, whereby said forward, return, and connecting legs form a single continuous U-shape;

said forward leg having a fixed end opposite said free end for mounting to an insulating base of said rotary encoder;

said return leg having a second end for contacting conductors on a rotor of said rotary encoder; and said rotor being rotatably connect to said base.

13. A contact element as in claim 12, wherein said generally planar element is bent so that said forward and return legs form an acute angle therebetween.

* * * * *